United States Patent [19]

Babcock

[11] 4,181,874
[45] Jan. 1, 1980

[54] TELEVISION S-CORRECTION CIRCUIT WITH IMPROVED LINEARITY

[75] Inventor: William E. Babcock, Warren, N.J.

[73] Assignee: RCA Corporation, New York, N.Y.

[21] Appl. No.: 859,861

[22] Filed: Dec. 12, 1977

[51] Int. Cl.² ............................................. H01J 29/70
[52] U.S. Cl. .................................... 315/370; 315/399
[58] Field of Search ................................ 315/370, 399

[56] References Cited

U.S. PATENT DOCUMENTS

| | | | |
|---|---|---|---|
| 2,817,788 | 12/1957 | Landon et al. | 315/390 |
| 2,916,665 | 12/1959 | Schlesinger | 315/399 |
| 3,795,835 | 3/1974 | Aldrich et al. | 315/370 |
| 3,949,167 | 4/1976 | Koyama et al. | 315/370 X |

Primary Examiner—Malcolm F. Hubler
Attorney, Agent, or Firm—Eugene M. Whitacre; Paul J. Rasmussen; William H. Meise

[57] ABSTRACT

A television kinescope deflection circuit having improved linearity includes a deflection winding coupled in series with a first capacitor. A deflection switch and retrace capacitor are coupled across the serial combination of the deflection winding and first capacitor. The first capacitor responds to the deflection current to form a linearizing signal which modifies the flow of deflection current to provide S-correction. The linearity correction is improved by a series-resonant circuit coupled in parallel with the first capacitor and tuned to the second harmonic of the deflection frequency.

3 Claims, 9 Drawing Figures

TELEVISION S-CORRECTION CIRCUIT WITH IMPROVED LINEARITY

BACKGROUND OF THE INVENTION

This invention relates to television kinescope deflection circuit arrangements for improving the S-correction.

In television kinescopes or picture tubes in which an electron beam is deflected by a magnetic field generated by the flow of the deflection current in a deflection winding, certain nonlinearities of the generated raster appear. One type of nonlinearity is attributable to the fact that the effective center of deflection of the electron beam is not coincident with the center of radius of curvature of the screen of the kinescope. The distance from the center of deflection to the edges of the kinescope is greater than the distance to the center of the kinescope screen. This difference in distance tends to be greater in the case of kinescopes having large deflection angles, and also increases as the radius of curvature of the faceplate increases (as the faceplate becomes flatter)

As a result of this source of nonlinearity, the deflection of the electron beam as a function of time, as seen on the raster displayed on the screen of the kinescope, becomes progressively greater near the edges of the screen. Since the information to be displayed in a television system is encoded at a constant rate, the information as displayed on the screen will appear to become compressed in the center of the raster and stretched near the edges.

A common method of compensating for the nonlinearity is to place an "S" capacitor in series with the deflection windings. With the addition of the S-capacitor, the deflection current rather than being a substantially linear ramp during the recurrent scanning intervals, becomes a segment of a sinewave having a reduction in the rate of increase of deflection current at the positive and negative extremes of the deflection current relative to that at the center. This in turn creates a slight reduction in the rate of scanning of the electron beam near the left and right edges of the raster relative to the center and a reduction in the stretch nonlinearity. However, for very large deflection angles or radius of curvature of the faceplate the sinewave S-correction if used to linearize the center portion of the scan becomes excessive, resulting in a picture compression at the edges of the raster. If the picture compression is avoided, insufficient S-correction occurs over the entire raster.

SUMMARY OF THE INVENTION

A television kinescope deflection arrangement having improved linearity includes a deflection winding through which an oscillatory current flows at the deflection frequency and a first linearity correction capacitor coupled in series with the deflection winding and responsive to the oscillatory deflection current to form a linearity correction signal. A retrace capacitor and a deflection switch are each coupled in parallel with the serial combination of deflection winding and first linearity correction capacitor, and an arrangement is provided for restoring energy losses. Improved linearity is provided by a decoupling circuit coupled to the first linearity correction capacitor for preventing the capacitor from responding to a component of the deflection current at the second harmonic of the deflection frequency.

DESCRIPTION OF THE INVENTION

Figure 1:
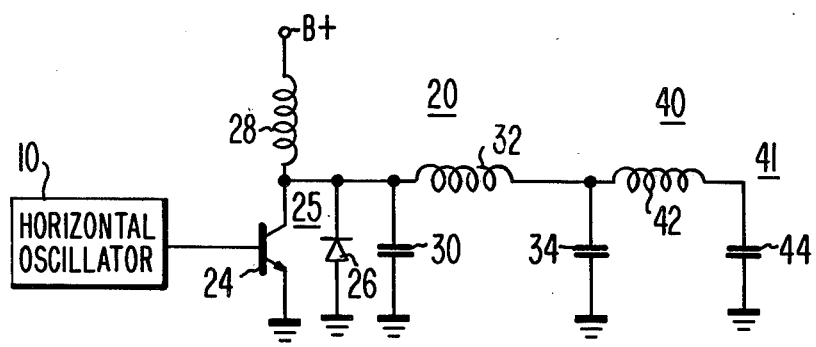
FIG. 1 is a diagram, partially in block and partially in schematic form of a television deflection arrangement embodying the invention.

Generally speaking, FIG. 1 illustrates a television horizontal deflection circuit designated generally as 20 of a type which is well-known, driven by a horizontal oscillator 10. A linearity correction circuit designated generally as 40 is coupled to deflection circuit 20.

Deflection circuit 20 includes a horizontal output switching transistor 24 having its emitter coupled to ground. The collector of transistor 24 is coupled to the cathode of a diode 26, the anode of which is coupled to ground. Transistor 24 and diode 26 together form a bidirectional switch designated generally as 25. The collector of transistor 24 is coupled to one end of a horizontal deflection winding 32, the other end of which is coupled through an S-shaping or linearity correction capacitor 34 to ground. A retrace capacitor 30 has one end grounded and the other end coupled to the junction of deflection winding 32 and the collector of transistor 24.

Energy is coupled to deflection circuit 20 from B+ by means of an inductor 28 coupled from B+ to the collector of transistor 24. The base of transistor 24 is driven from a horizontal oscillator 10 synchronized by pulses from a synchronizing signal separator, not shown.

Linearity correction circuit 40 includes a series-resonant circuit designated generally as 41, consisting of an inductor 42 and a capacitor 44. The series resonant circuit is coupled in parallel with S-capacitor 34.

Figure 2A:
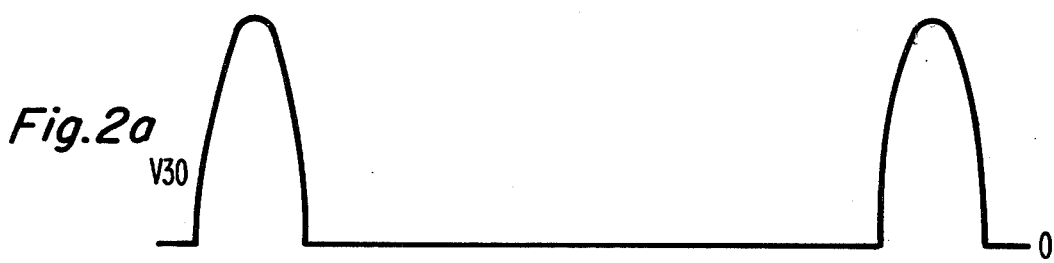
FIG. 2 illustrates amplitude-time waveforms related to the arrangement of FIG. 1.
Figure 2B:
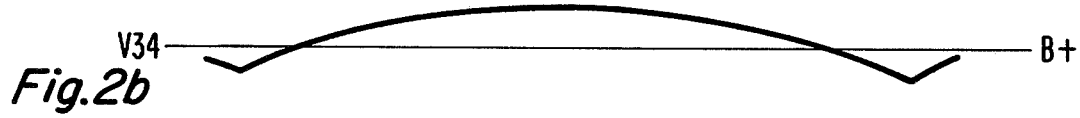
Figure 2C:
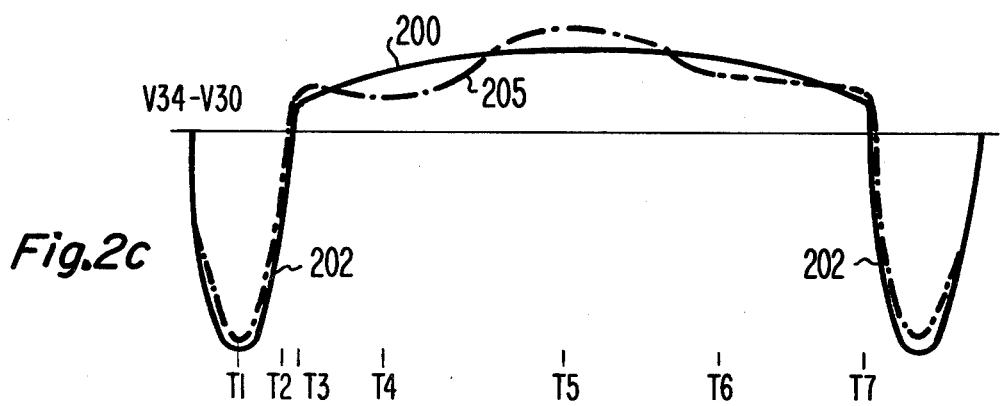
Figure 2D:
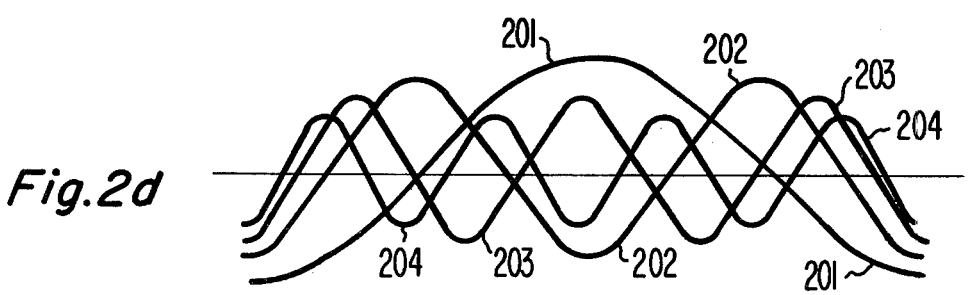
Figure 2E:
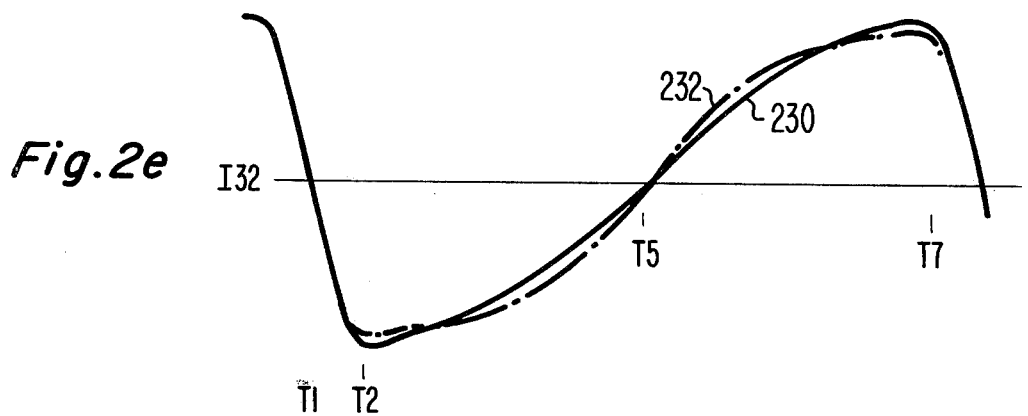

While the operation of a horizontal deflection circuit such as 20 is well known, a brief description follows. During the second half of the horizontal scanning or trace interval extending from time T5 to time T7, transistor 24 is saturated and its collector is essentially at ground potential as illustrated in FIG. 2a. A linearly increasing conventional current flows from B+ through inductor 28 and the collector of transistor 24 to ground. Simultaneously, conventional current flows through winding 32 and the collector of transistor 24 to ground and is increasing with time under the impetus of the voltage on capacitor 34 illustrated in FIG. 2b. As increasing current flows in inductor 32, as shown in FIG. 2e after time T5, the voltage across capacitor 34 decreases in a parabolic fashion as charge is removed at an increasing rate. The voltage across deflection winding 32 during operation may be represented by waveform 200 of FIG. 2c, which represents the difference between the voltage across capacitor 34 and that across capacitor 30.

At time T7, transistor 24 is rendered nonconductive by application of a negative-going signal to its base from oscillator 10 to begin the retrace interval. This opens switch 25, and the energy stored as current flow in inductors 28 and 32 begins to be transferred to retrace capacitor 30 in a resonant manner with a frequency having a period of twice the retrace interval. The voltge across capacitor 30 rises, as shown by FIG. 2a and by the negative-going portions of FIG. 2c. The current in inductors 28 and 32 decreases to zero as the retrace voltage across capacitor 30 peaks at time T1. At this time, energy in the oscillatory circuit including inductor 32 and capacitor 34 has been transferred to retrace capacitor 30. Additionally, energy stored in inductor 28 has also been transferred to capacitor 30.

The high retrace voltage across capacitor 30 at T1 appears across winding 32 as pulse portion 202 of waveform 200. The retrace voltage across capacitor 30 reverses the current in inductors 28 and 32, and current flows into B+ and into capacitor 34 at an increasing rate, while the voltage across capacitor 30 drops. The voltage across capacitor 30 continues to decrease until some time such as T2 at which the voltage across capacitor 30 equals B+. At time T2, there is no net voltage across the inductors, and the currents no longer increase. Charge continues to be removed from capacitor 30, however, and the voltage across capacitor 30 rapidly decreases in a resonant manner to zero at a time T3, at which time diode 26 becomes conductive, retrace ends and the trace interval begins.

During the first half of the horizontal trace interval, diode 26 conducts as the energy stored as current in winding 32 flows into capacitor 34. As the current decreases in winding 32 during the first half of the horizontal trace interval, the voltage across capacitor 34 rises parabilically as indicated by FIG. 2b and by waveform 200 of FIG. 2c.

The parabolically varying voltage across capacitor 34 attributable to the flow of deflection current in winding 32 causes the rate of change of current in winding 32 to be greater near the center of the horizontal scanning interval compared with the beginning and end. This corresponds to a lesser rate of change of scanning current at the left and right of the screen, which is the well-known S-correction. Winding 32 and capacitor 34 may be viewed as a resonant circuit having a period or resonant interval, with the horizontal scanning interval extending over the more linear central portion of the resonant interval.

In the case of a wide deflection angle and/or a kinescope screen having a large radius of curvature, the S-correction may be insufficient to completely linearize the displayed information as mentioned earlier, with the result that there will be a residual relative compression in the center of the raster and expansion on the left and right extremes.

Figure 2F:
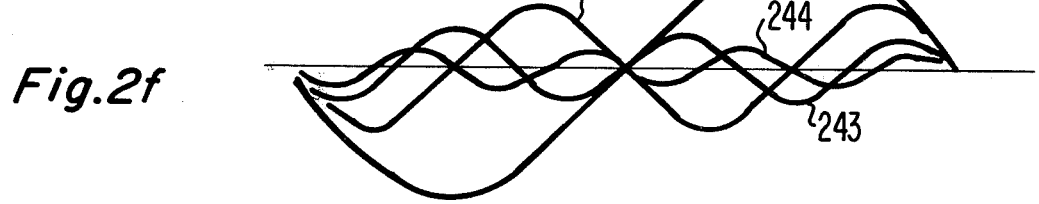

Waveform portion 200 appearing across deflection winding 32 is composed of a large number of harmonics, both odd and even. The amplitude of the first few spectral components of the wave are almost equal, as shown in FIG. 2d. In FIG. 2d, 201 represents the fundamental component of waveform 200, and 202 through 204 represent the second through fourth harmonics, respectively. The S-corrected sinusoidal current waveform 230 as shown in FIG. 2e also contains a large number of spectral components, the first four of which are shown in FIG. 2f. In FIG. 2f, waveform 241 represents the fundamental current component contained in S-corrected current waveform 230. Waveforms 242 and 244 represent the second through fourth harmonic components, respectively. Comparison of the components of the voltage applied across deflection winding 32 as shown in FIG. 2d with the corresponding components of the resulting deflection wave, as shown in FIG. 2f, reveals that the current components are phase-shifted with respect to the components of the applied voltage.

In accordance with the invention, series resonant circuit 41 coupled across S-shaping capacitor 34 is tuned to a frequency approximately equal to the second harmonic of the deflection frequency. Series resonant circuit 41 represents a low-impedance path by which second-harmonic components of the deflection current may bypass capacitor 34. As a result, that portion of the voltage applied across deflection winding 32 attributable to the voltage across capacitor 34 is modified by the elimination of second harmonic component 242. The resulting voltage across winding 32 as modified is illustrated by waveform 205 of FIG. 2c. In effect the winding is decoupled from the source at the second harmonic frequency.

The peaked form of voltage waveform 205 resulting from the elimination of second-harmonic current 242 from the total current flow in capacitor 34 causes the current flow in inductor 32 to be modified. As shown by waveform 232 of FIG. 2d, the increase in voltage 205 by comparison with voltage 200 around time T5 causes an increase in the rate of change of current. Similarly, near times T4 and T6, the decreased magnitude of the voltage across inductor 32 tending to promote current flow in inductor 32 reduces the rate of change (slope) of current in the deflection winding. It will be noted that, by comparison with S-corrected deflection current waveform 230, waveform 232 has an increased slope near the center T5 of the trace interval, the same slope near T4 and T6 and a reduced slope at the left and right edges of the raster. This tends to reduce both the residual compression in the center of the screen and the expansion at the extremes of the screen remaining after the S-correction is made, without affecting intermediate portions. It will be understood that while waveform 232 has a peak amplitude slightly less than that of waveform 230, this is merely for illustrative purposes, and the peak amplitudes will actually be equal for equal size rasters.

Figure 2G:
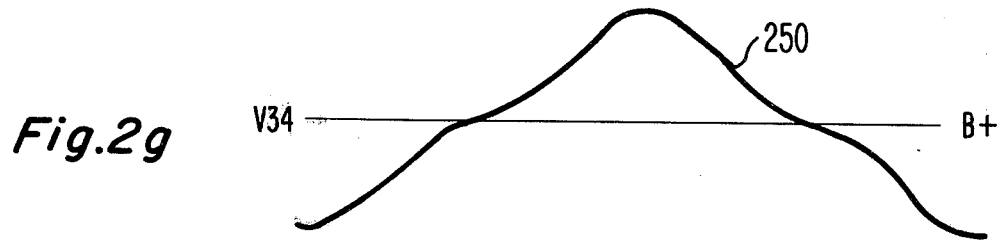
Figure 2H:
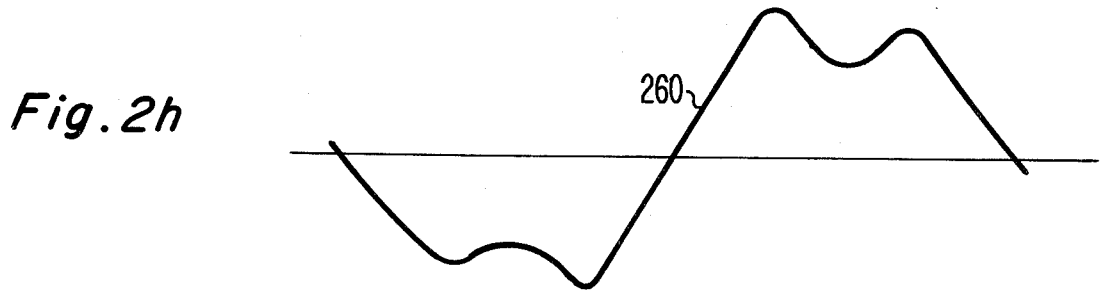

FIG. 2g illustrates the alternating component of the voltage appearing across capacitor 34 in the presence of linearity correction circuit 40. Rather than the parabolic component well-known from the prior art, alternating waveform 250 resembles instead a modified triangular wave. FIG. 2h illustrates as waveform 260 the current flowing during a horizontal trace interval in capacitor 34 in the presence of linearity correction circuit 40. Waveform 260 represents the difference between waveform 232 and component 242.

Other embodiments of the invention will be apparent to those skilled in the art. In particular, a parallel-resonant circuit tuned to the second harmonic of the deflection frequency may be placed in series with deflection winding 32 for preventing the flow of deflection current at the second-harmonic frequency. Resistance may be introduced into the resonant circuit to control the magnitude of the second harmonic current. Inductor 28 may be included in the primary circuit of a horizontal transformer, or the primary of such a transformer may be coupled across switch 25. Furthermore, pincushion correction impedances may, as is known, be connected in circuit with the horizontal deflection winding. Other impedance, such as a saturable linearity coil, may also be coupled in series with the horizontal deflection winding without departing from the invention.

What is claimed is:

1. A television kinescope deflection arrangement having improved linearity; comprising:
 a kinescope deflection winding through which an oscillatory current flows at a deflection frequency;
 first linearity correction capacitance means coupled in series with said deflection winding and responsive to said oscillatory current to form a deflection linearity correction signal;

retrace capacitance means coupled in parallel with the serial combination of said deflection winding and said first linearity correction capacitive means;

a deflection switch coupled across said retrace capacitance means and operated at said deflection frequency to form recurrent trace and retrace portions of said oscillatory current;

energy restoring means coupled to said deflection winding for maintaining said oscillatory current; and a series resonant circuit coupled in parallel with said first linearity correction capacitance means for reducing the flow of said oscillatory current at the second harmonic of said deflection frequency.

2. A television kinescope deflection arrangement according to claim 1 wherein said series resonant circuit is tuned to said second harmonic frequency.

3. A television kinescope deflection apparatus according to claim 2 wherein said first linearity correction capacitance means comprises an S-capacitor, said deflection switch comprises a switching transistor paralleled with a diode and said energy restoring means comprises inductance means coupled to a source of energizing potential and to the collector of said switching transistor.

* * * * *